A. JAKOVLEFF.
MULTIPLE TREAD PNEUMATIC TIRE.
APPLICATION FILED JULY 9, 1918. RENEWED AUG. 18, 1919.
1,335,710. Patented Mar. 30, 1920.
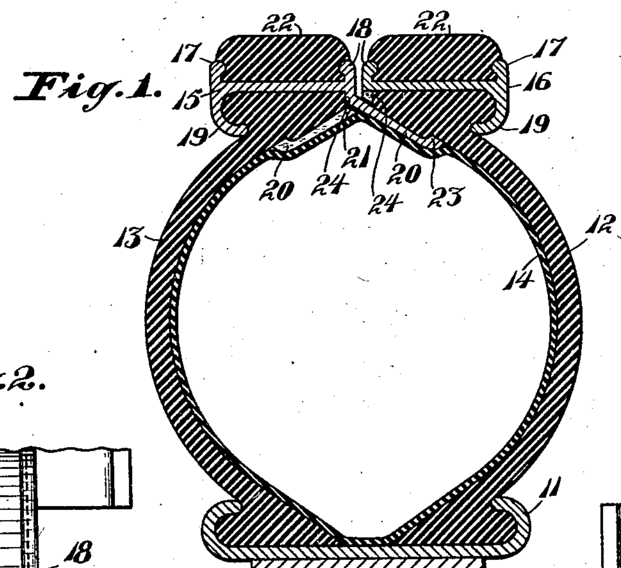
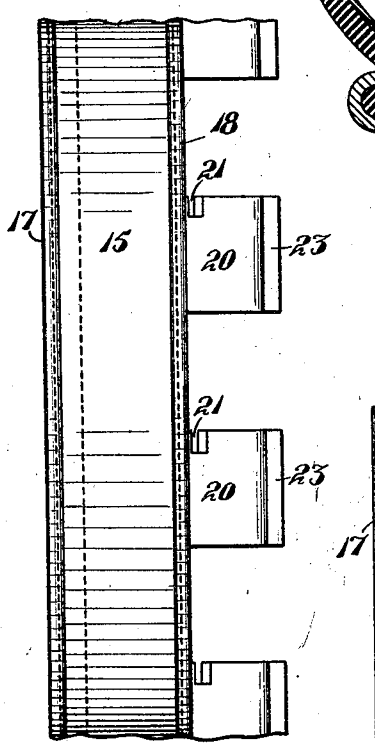
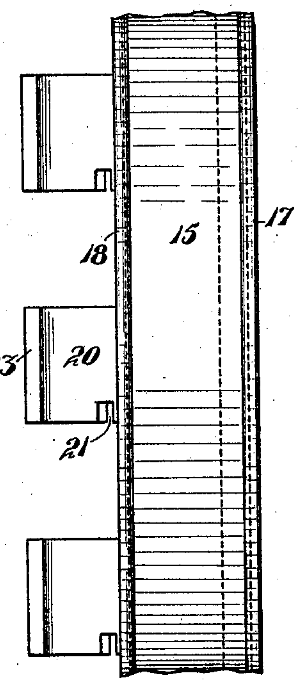
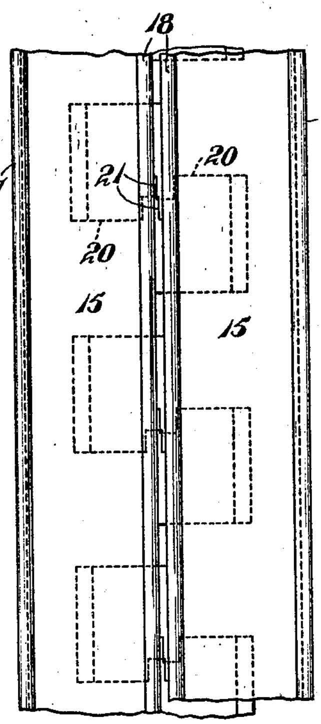
Inventor
Alexis Jakovleff
By Strong & Townsend
Attorneys

UNITED STATES PATENT OFFICE.

ALEXIS JAKOVLEFF, OF SAN FRANCISCO, CALIFORNIA, ASSIGNOR TO JAK TIRE CORPORATION, OF SAN FRANCISCO, CALIFORNIA, A CORPORATION OF CALIFORNIA.

MULTIPLE-TREAD PNEUMATIC TIRE.

1,335,710. Specification of Letters Patent. Patented Mar. 30, 1920.

Application filed July 9, 1918, Serial No. 244,062. Renewed August 18, 1919. Serial No. 318,310.

*To all whom it may concern:*

Be it known that I, ALEXIS JAKOVLEFF, a subject of the Emperor of Russia, residing at the city and county of San Francisco and State of California, have invented new and useful Improvements in Multiple-Tread Pneumatic Tires, of which the following is a specification.

This invention relates to a pneumatic tire, and particularly pertains to a tire casing of sectional formation provided with multiple tread members.

It is the principal object of this invention to provide a pneumatic tire, the casing of which may be readily separated and removed without difficulty, and which is designed to receive a circumscribing tire tread of sectional construction by which the casing sections are secured together, thus insuring that a conveniently manipulated tire may be provided as well as increasing the durability of the tire structure and its resilient qualities.

The present invention contemplates the use of a tire casing adapted to be mounted upon a common tire rim, and which is formed in separate annular halves united along their circumferential portions by unlocking metallic tread rings which carry auxiliary tire treads.

The invention is illustrated by way of example by the accompanying drawings in which—

Figure 1 is a view in transverse section taken radially of a tire formed according to the principle of the present invention.

Figs. 2 and 3 illustrate fragmentary portions of the complementary tread rings.

Fig. 4 is a fragmentary view in elevation illustrating portions of the tread rings operably engaged.

Referring more particularly to the drawings, 10 indicates a wheel felly upon which is mounted a tire rim 11. This rim may be of any desired construction, but it is preferably designed to permit a tire to be demounted therefrom without difficulty. Detachably mounted upon the rim 11 are a pair of complementary casing sections 12 and 13. These sections are separated along the longitudinal circumference of the tire, and when united, form a continuous annular chamber for the reception of a pneumatic tube 14. In the present instance the outer and inner circumferential faces of each casing section are provided with annular laterally extending flanges. The inner of these flanges are engaged by the rim 11, while the outer flanges are engaged by the complementary tread rings 15 and 16.

The tread rings are specially disclosed in Figs. 2, 3 and 4, where it will be seen that each ring comprises a flat annulus along the opposite marginal edges on which are outwardly extending flanges 17 and 18. Extending diametrically opposite from the flanges 17 are inturned engaging flanges 19, by which the outer flanges of the casing are secured. It is to be noted that the terminating edge casing sections are substantially wedge-shaped, and for this reason divergently extending tongues 20 are formed along the contiguous edges of the tread rings 15 and 16, and overlap to conform to the inclined inner faces of the casing, it being understood that the outer circumference of the casing sections are flat when considered laterally. These tongues not only cross and intermesh with each other, but are provided with locking recesses 21, by which they may be caused to be held against accidental removal. In this manner a limited relative movement is afforded between the two rim members, and thus provides local movement of the resilient treads 22 carried by the rings. The tongues are also formed with out-turned ends which provide locking ridges 23 adapted to become embodied within the inner surfaces of the casing sections and to therefore prevent relative movement of the sections in relation to the casing and separation of the rims. The inner faces of the tongues are, of course, made smooth at their ends, preferably rounded to prevent wear of the inner tube 14 and the possible puncture thereof.

In applying the present device to a vehicle wheel it is only necessary to provide a wheel of standard construction and dimension, upon which the usual rim is mounted. Over this rim are placed the complementary casing sections between which is positioned the inner tube 14. After the tube has been properly placed with its inflating stem through the opening in the wheel felly, the outer circumferential edges of the casing sections may be bound together. This is done by applying one of the rings to each of the sections with their inturned flanges in engagement with the outwardly extending flanges of the casings. When in this position the outer circumferential portions of each casing section will be firmly held, due to the coöperation of the inturned ring flanges with an annular shoulder 24 formed at the point of immanation of the tongues from the ring.

After the outer edges of the casing sections have been properly bound by the tread rims, these rims may be brought with their tongues intermeshing, as particularly shown in Fig. 4. When in this position the treads 22 will be in lateral alinement, and the groove portions 21 of the tongues will be interlocked to produce a support for the treads 22. It will be readily recognized that the treads may be easily interchanged or replaced when desired, and that they will be afforded sufficient relative movement to insure desirable riding qualities for the tire.

When it is desired to replace or repair the inner tube the two outer rims may be moved circumferentially in relation to each other until the tongues become disengaged at their recesses 21. After this has been done the tongues and rings may be separated and ready access afforded to the interior of the casing. It will, of course, be possible to remove either of the casing sections after the tread rims have become disengaged.

It will thus be seen that the tire structure here disclosed provides simple means for incasing a tire tube, and proper means for surrounding the tube with a metallic armor to prevent its puncture and segmental replacement of treads, which are adapted to yield and to afford proper traction for the tire.

While I have shown the prefered form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent is—

1. A pneumatic tire comprising separate annular casing walls, means for detachably securing the inner edges of said walls together, and circumscribing tread bearing means provided on the outer edges of said walls whereby they may be temporarily interlocked and unlocked by relative circumferential movement of said means.

2. A pneumatic tire comprising an inflation tube, annular casing parts adapted to unite to inclose said tube, a band upon which said parts are mounted, and by which they are held together along their inner edges, and a pair of annular members connected so as to have relative movement and mounted upon the outer edges of said parts whereby said outer edges may be secured to each other to complete the inclosure of said inflation tube.

3. A pneumatic tire comprising a casing formed of two complementary halves, a detachable tread member fitted upon each of said halves, and means for simultaneously locking said tread members and casing halves together to form an annular pneumatic tube compartment.

4. A pneumatic tire comprising a casing formed of two complementary halves, a detachable tread member fitted upon each of said halves, means for simultaneously locking said tread members and casing halves together to form an annular pneumatic tube compartment, and means whereby said tread members may have yieldable movement in relation to each other.

5. In a pneumatic tire, a sectional casing, and a pair of members for securing the peripheral portions of the casing sections together, said members having inner portions which cross each other.

6. In a pneumatic tire, a sectional casing, a pair of members for securing the peripheral portions of the casing sections together, and means for interlocking said members so as to allow of separation thereof by relative circumferential movement.

7. In a pneumatic tire, a sectional casing, and a pair of sectional means one for each casing section for securing the casing sections together, said sections of the sectional means having portions which respectively engage the inner faces of the opposite casing section.

8. In a pneumatic tire, a sectional casing, and sectional means having relative movement therebetween for securing the casing sections together.

9. In a pneumatic tire, a sectional casing, a pair of members for securing the casing sections together, and means to connect said members so as to allow the latter to have relative movement therebetween.

10. In a pneumatic tire, a sectional casing, a pair of members for securing the casing sections together, said members having tread holding means on their outer portions and having crossed and movably connected inner portions, said crossed inner portions engaging the inner faces of the respective casing sections, and means borne by said members to engage the outer edge portions of the casing sections.

11. In a pneumatic tire, a peripherally divided casing, a pair of interengaging means extending around the periphery of the casing tread for simultaneously securing each of the edges of said casing together, and means to allow of separation of said first named means by relative circumferential movement thereof.

12. In a pneumatic tire, a sectional casing, a pair of separable tread bearing members extending circumferentially of the casing, and interengaging means borne by said members to connect same together.

13. In a pneumatic tire, a sectional casing, a pair of tread bearing members extending circumferentially of the casing and arranged thereover, and means borne by the members and bearing against the inner faces of the respective opposite sections to secure the casing sections together.

14. In a pneumatic tire, a sectional casing, and sectional means to secure the casing sections together, said means having spaced tongues to engage interiorly of the casing sections.

15. In a pneumatic tire, a sectional casing, and sectional means to secure the casing sections together, said means having spaced tongues to engage interiorly of the casing sections, the tongues having mutual locking recesses in one of their side edges.

16. In a pneumatic tire, a sectional casing, and sectional means to secure the casing sections together, said means having portions engaging the inner faces of the respective opposite tire sections and other portions opposite to the first-named portions and engaging the outer faces of the casing sections.

17. In a pneumatic tire, a sectional casing, a pair of tread-bearing members having means to secure the casing sections together, and means to connect said members at the tread portions thereof so as to allow of relative movement therebetween.

In testimony whereof I have hereunto set my hand in the presence of two subscribing witnesses.

ALEXIS JAKOVLEFF.

Witnesses:

ALVA MILLER,

CONSTANCE M. GAMMETER.